United States Patent [19]

Nakamura

[11] Patent Number: 5,068,587

[45] Date of Patent: Nov. 26, 1991

[54] SPINDLE DRIVE CONTROL APPARATUS FOR A MACHINE TOOL

[75] Inventors: Kosei Nakamura; Shinichi Kono; Kazuhisa Numai; all of Yamanashi, Japan

[73] Assignee: Fanuc Ltd., Yamanashi, Japan

[21] Appl. No.: 393,905

[22] PCT Filed: Dec. 16, 1988

[86] PCT No.: PCT/JP88/01276
§ 371 Date: Aug. 1, 1989
§ 102(e) Date: Aug. 1, 1989

[87] PCT Pub. No.: WO89/06067
PCT Pub. Date: Jun. 29, 1989

[30] Foreign Application Priority Data

Dec. 19, 1987 [JP] Japan .................. 62-320151

[51] Int. Cl.[5] .............................................. H02P 1/26
[52] U.S. Cl. ..................................... 318/771; 318/773; 318/783
[58] Field of Search ........................... 318/727-826

[56] References Cited

U.S. PATENT DOCUMENTS

| 1,499,853 | 7/1924 | Creedy | 318/773 |
|---|---|---|---|
| 1,536,077 | 5/1925 | Creedy | 318/773 X |
| 1,711,979 | 5/1929 | Wernert | 318/773 X |
| 1,927,208 | 9/1933 | Gay | 318/771 |
| 2,217,460 | 10/1940 | Trassel | 318/771 |
| 2,280,987 | 4/1942 | Trassel | 318/778 |
| 2,397,183 | 3/1946 | Kilgore et al. | 318/777 X |
| 2,575,716 | 11/1951 | Kilgore | 318/771 |
| 2,693,561 | 11/1954 | Barrell | 318/778 |
| 2,959,721 | 11/1960 | Butler et al. | 318/773 |
| 3,070,734 | 12/1962 | Rawcliffe | 318/773 |
| 3,221,233 | 11/1965 | Cantonwide | 318/773 |
| 3,860,093 | 1/1975 | Mitsui et al. | 318/771 X |
| 3,916,257 | 10/1975 | Harper, Jr. | 318/771 X |
| 3,935,519 | 1/1976 | Pfarrer et al. | 318/783 X |
| 4,041,542 | 8/1977 | Pfarrer et al. | 318/783 X |
| 4,221,999 | 9/1980 | Gausman, Jr. | 318/773 X |
| 4,446,415 | 5/1984 | Taylor et al. | 318/798 |
| 4,477,760 | 10/1984 | Kuznetsov | 318/773 |
| 4,675,591 | 6/1987 | Pleiss | 318/771 X |
| 4,680,515 | 7/1987 | Crook | 318/318 |
| 4,691,155 | 9/1987 | Taylor et al. | 318/771 |
| 4,719,560 | 1/1988 | Ford | 318/769 X |
| 4,734,634 | 3/1988 | Kito et al. | 318/778 |
| 4,736,147 | 4/1988 | Shizhang | 318/778 |
| 4,736,148 | 4/1988 | Hirata | 318/812 |
| 4,772,842 | 9/1988 | Ghosh | 318/778 |
| 4,792,740 | 12/1988 | Smith | 318/768 |
| 4,831,469 | 5/1989 | Hanson et al. | 318/254 |

FOREIGN PATENT DOCUMENTS 50-20241 7/1975 Japan .
56-110484 9/1981 Japan .

Primary Examiner—Paul Ip
Attorney, Agent, or Firm—Armstrong, Nikaido, Marmelstein, Kubovcik, & Murray

[57] ABSTRACT

Provided is a spindle drive control apparatus which is provided with a single three-phase spindle motor (60) for rotatingly driving a spindle (50) of a machine tool and a solenoid relay (70) for switching the phase windings (U, V, W) of the motor between a delta (Δ) and star (Y) state and which switches the phase windings to the delta connection when rotating the spindle (50) at high speed for heavy duty cutting work and switches to the star connection for generating the high torque when rotating at a superlow speed (for example, 0.5 rpm) for contouring machining work etc. In this way, it becomes possible to handle the machining work performed in the past with two types of motor by using just a single motor, thus contributing to reduced costs.

2 Claims, 2 Drawing Sheets

SPINDLE DRIVE CONTROL APPARATUS FOR A MACHINE TOOL

TECHNICAL FIELD

The present invention relates to a spindle drive control apparatus in a machine tool which can rotate the spindle motor at a high speed with a high power and which can rotate the spindle motor at a superlow speed (for example, about 0.5 rpm) with high torque. That is, it relates to a spindle drive control apparatus for a machine tool which can handle both high speed heavy duty cutting machining and drilling and contouring by a single spindle motor.

BACKGROUND ART

In a machine tool, when controlling the angular position of the spindle or spindle motor, that is, when drilling or contouring during C-axis control, it is necessary that the spindle be rotated smoothly at a superlow speed and have a high torque. Further, for normal cutting machining etc. high speed rotation and a high cutting power are required.

Therefore, in the past, two motors were provided for driving the spindle. One was the spindle motor for rotating the spindle at a high speed for cutting machining etc. The other was a C-axis control motor having a detector. This C-axis control motor had an output shaft affixed to a worm. A worm gear engaged with the worm was affixed to the spindle. In this way, during C-axis control, the C-axis control motor was driven to rotate the spindle at a superlow speed. To switch to normal cutting machining etc. after this, the above-mentioned C-axis control motor had to be retracted to a retraction position and the spindle motor driven.

However, as mentioned above, two types of motors had to be provided and, further, worm gears, retraction mechanisms, etc. were necessary. Therefore, the apparatus can not be said to have been the best in space or cost.

DISCLOSURE OF THE INVENTION

Therefore, the present invention has an object to resolve these problems by the provision of a spindle drive control apparatus for a machine tool which uses a single spindle motor and which can be applied to both high speed rotational machining and superlow speed rotational machining.

In view of the above object, the present invention provides a spindle drive control apparatus for a machine tool characterized by comprising a three-phase spindle motor which rotatingly drives a spindle of a machine tool, a rotational position detector which detects the rotational position of the said spindle, and a connection switching means which can switch the connection states of the phase windings of the three-phase spindle motor between a Δ (delta) connection and Y (star) connection.

To rotate the spindle at high speed, the three-phase spindle motor is switched to the Δ connection, and to rotate it at superlow speed, it is switched to the Y connection. When switched to the Y connection, the base speed becomes lower than the Δ connection and the torque generated becomes larger by a corresponding amount.

BEST MODE FOR CARRYING OUT THE INVENTION

Figure 1:
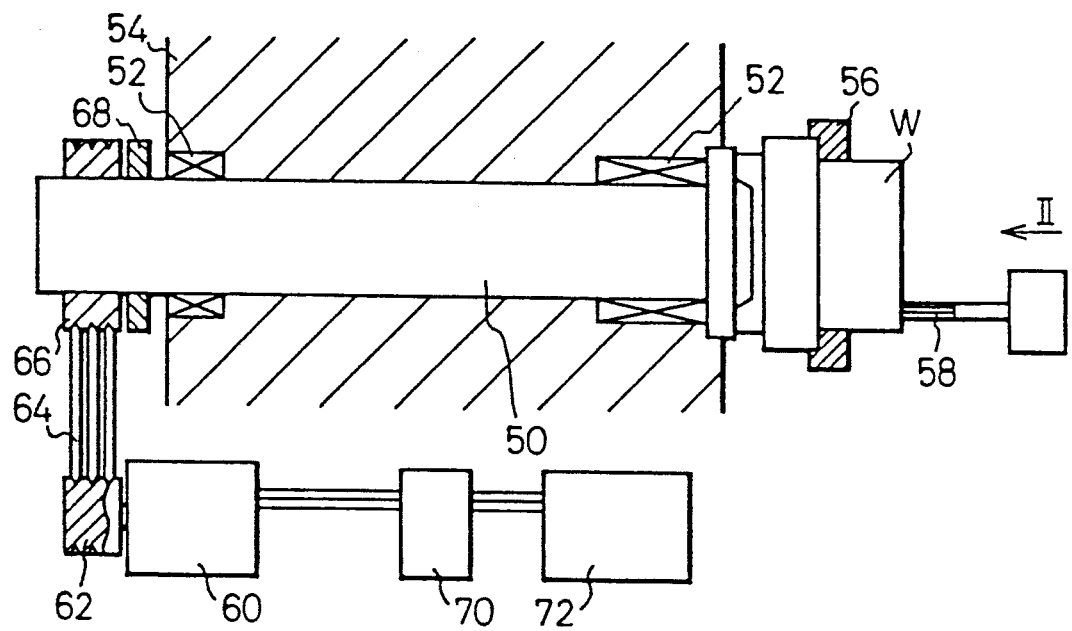
FIG. 1 is a schematic view of the constitution of the present invention.

Below, the present invention will be explained in further detail based on the embodiments shown in the attached drawings. Referring to FIG. 1, a spindle 50 axially supported through a bearing 52 by a spindle head housing 54 of the machine tool is rotatingly driven by a three-phase spindle motor 60 (three phase induction motor). That is, a belt 64 is stretched over a pulley 62 provided on the output shaft of the spindle motor 60 and another pulley 66 provided on the spindle 50 so as to rotatingly drive the spindle 50. This position of angular rotation and rotational speed are detected by a known pulse encoder or other positional detector 68.

Figure 2:
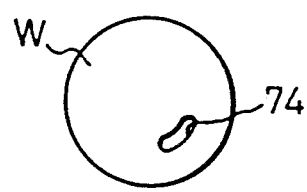
FIG. 2 is a front view of a workpiece along the arrow line II of FIG. 1.

At the end of the spindle 50 is mounted a workpiece W through a chuck 56. The workpiece W is machined by a tool 58. When cutting the outer circumference of the workpiece W etc., the spindle 50 is rotated at a high rotational speed of about 3000 rpm and cutting power is required. On the other hand, FIG. 2 is a front view of a workpiece W along the arrow line II of FIG. 1. The contour hole 74 illustrated is sometimes made using a rotary tool 58 like a reamer. In this case, the rotary tool 58 just rotates. The center axial line of rotation does not move. Rather, the workpiece W has to be rotated, for example, at a superlow speed of 0.5 rpm or so with the spindle 50 to change the relative positions of the workpiece W and the rotary tool 58. The drive apparatus driving the spindle 50 must generate a high torque.

In the former high power, high speed rotation, the various phase windings of the three-phase spindle motor 60 are given the Δ (delta) connection. If it is attempted to obtain the latter superlow speed rotation in the Δ connection state, the three phase spindle motor 60 suffers from insufficient torque and uneven speed.

Figure 3:
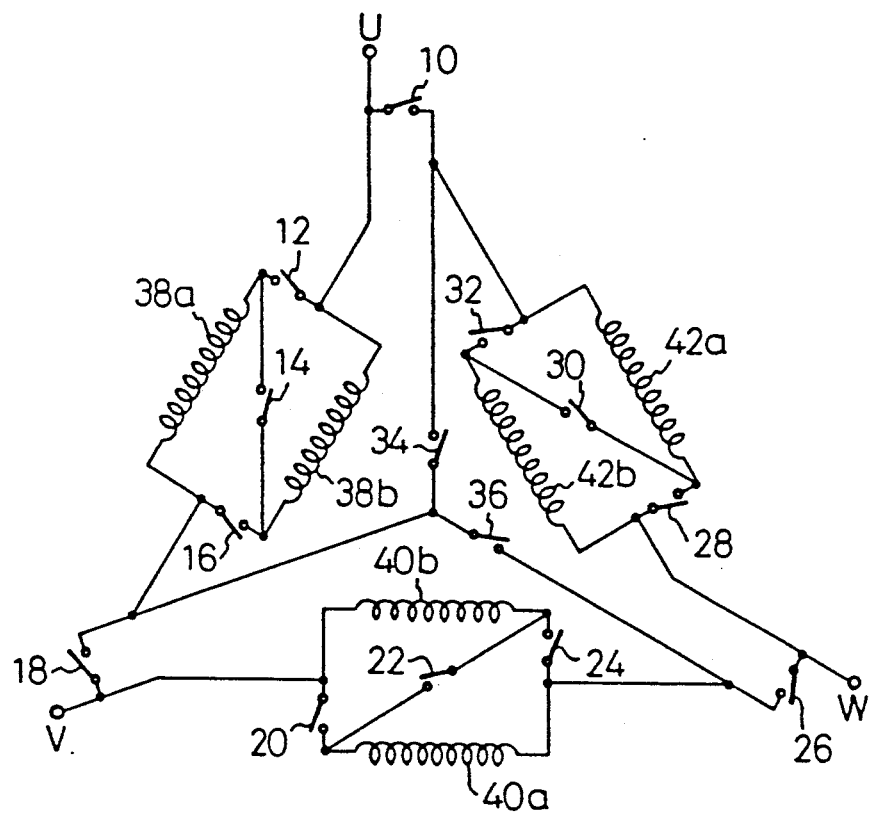
FIG. 3 is a schematic view of switching the connections of motor windings.

Therefore, in the present invention, during superlow speed rotation, the phase windings of the motor 60 are switched to the Y (star) connection to obtain a high torque. The current is supplied to the motor 60 driving the spindle while controlling the current by a known inverter circuit 72. The switching of connections between Δ and Y is performed using a solenoid relay 70. Instead of the solenoid relay 70, a semiconductor switch (thyristor or triac) may be used. FIG. 3 schematically illustrates the state of connection of the windings 38a, 38b, 40a, 40b, 42a and 42b of the three phases (U, V, W) by the switches 10 to 36. If these switches 10 to 36 are operated as shown in Table 1, one type of Δ connection and two types of Y connections shown by the symbols Δ, Y, Y' are obtained.

TABLE 1

| | Switching of Δ and Y Connections | | |
|---|---|---|---|
| Switch nos. | Δ | Y | Y' |
| 10 | Closed | Open | Open |
| 12 | Closed | Open | Closed |
| 14 | Open | Closed | Open |

TABLE 1-continued

| | Switching of Δ and Y Connections | | |
|---|---|---|---|
| Switch nos. | Δ | Y | Y' |
| 16 | Closed | Open | Closed |
| 18 | Closed | Open | Open |
| 20 | Closed | Open | Closed |
| 22 | Open | Closed | Open |
| 24 | Closed | Open | Closed |
| 26 | Closed | Open | Open |
| 28 | Closed | Open | Closed |
| 30 | Open | Closed | Open |
| 32 | Closed | Open | Closed |
| 34 | Open | Closed | Closed |
| 36 | Open | Closed | Closed |

In this embodiment, the pairs of windings 38a and 38b, 40a and 40b, and 42a and 42b are combined so as to form parallel and serial connections at the time of the Δ connection and Y connection. This will be explained with reference to FIG. 4. The horizontal axis N shows the rotational speed of the motor, while the vertical axis P shows the output of the motor. When the pairs of phase winding shown in Table 1 are Δ connected to be in parallel states, that is, at high speed, the base speed N1 is made 1500 rpm. When the windings 38a to 42b are comprised of windings of exactly the same state (same inductances), if one switches to the Y connection in the state with the pairs of windings as they are in the parallel state, that is, in the Δ connection state of Table 1, if the switches 10, 18, and 26 are changed from the closed to open state and the switches 34 and 36 are changed from the open to closed state, the result is the state shown by the symbol Y' in Table 1. This is the case of the two-dot chain line B in FIG. 4 and the base speed N2 is $1500/\sqrt{} $ r.p.m. Further, in the state of the other Y connection shown by the symbol Y in Table 1, that is, in the case of superlow speed rotation where the pairs of windings 38a and 38b, 40a and 40b, and 42a and 42b are in series, the inductances of the phases are double and the base speed N3 falls to $1500/(2\sqrt{3})$ rpm.

Figure 4:
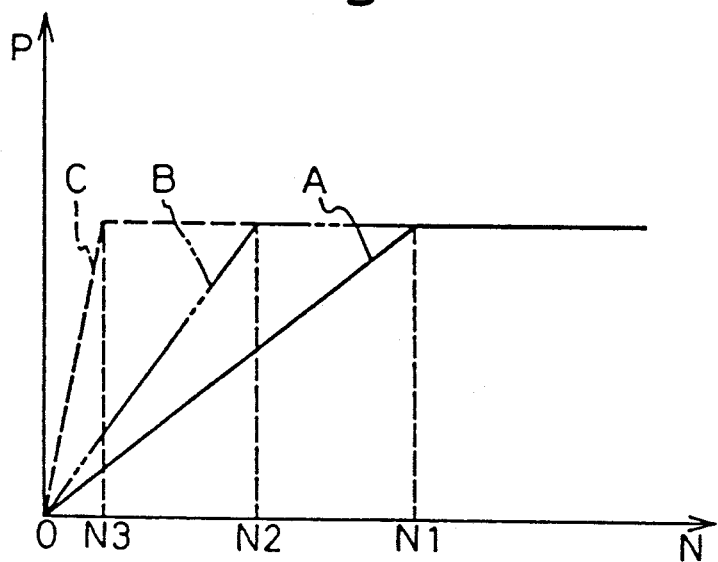
FIG. 4 is a view explaining the mode of operation of the present invention.

In FIG. 4, the solid line A sows the Δ connection of Table 1. This is a curve of the change when controlling the drive of the three-phase single motor 60 of FIG. 1. The broken line C corresponds to the Y connection shown by the symbol Y in Table 1. The rising gradients of the curves A and C show the magnitude of the torque. In the case of the broken line C, a torque $2\sqrt{3}$ times than of the solid line A is generated.

If the motor is switched from the Δ to Y connection so as to reduce the base speed, the theoretical maximum power of the motor falls in inverse proportion to the square of the ratio of the drop in the base speed. Therefore, the required power cannot be reached in many cases and there is no meaning in lowering the base speed before the connection is switched. However, in C axis control for controlling contouring work at a superlow rotational speed, the cutting is performed by the rotational power of the rotary tool itself, so the output of the spindle motor is not needed that much. Only a torque is required. Therefore, the switching of the windings of the present invention works effectively.

As clear from the above explanation, according to the present invention, it is possible to use one spindle motor for high speed rotation with a high power and to use it for superlow speed rotation with a high torque allowing smooth rotation. Other motors and their attached devices become unnecessary, thus enabling reduction of costs.

We claim:

1. A spindle drive control apparatus for a machine tool, comprising:
 a rotational position detector which detects a rotational position of a spindle of the machine tool; and
 a three-phase spindle motor which rotatingly drives said spindle of the machine tool, having
  a pair of windings for each phase,
  a terminal for said each phase for supplying power, and
  a group of switch means including a first switch means for connecting each winding of said pair of windings for each phase in series, second switch means for connecting each winding of said pair of windings for each phase in parallel, third switch means for connecting said each pair of windings for each phase in a Δ connection when said second switch means is connecting each winding of said pair of windings in parallel, and fourth switch means for connecting said each pair of windings for each phase in a Y connection when one of said first and second switch means is connecting each winding of said pair of windings in one of series and parallel.

2. A spindle drive control apparatus for the machine tool according to claim 1 wherein said second switch means includes a pair of switches for each pair of windings.

* * * * *